United States Patent Office 3,372,984
Patented Mar. 12, 1968

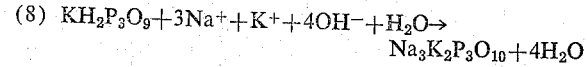

3,372,984
TRISODIUM DIPOTASSIUM TRIPOLYPHOSPHATES AND PROCESSES FOR THEIR MANUFACTURE
Joe S. Metcalf, Trenton, Mich., and Kenneth J. Shaver and Chung Yu Shen, St. Louis, Mo., assignors to Monsanto Company, St. Louis, Mo., a corporation of Delaware
No Drawing. Filed Apr. 21, 1964, Ser. No. 361,566
18 Claims. (Cl. 23—107)

ABSTRACT OF THE DISCLOSURE

The new compounds selected from the group consisting of hydrated and anhydrous trisodium dipotassium tripolyphosphates and a process for producing them comprising reacting in an aqueous slurry a strong base selected from the group consisting of strong sodium cation-bearing bases and strong potassium cation-bearing bases and a triphosphate selected from the group consisting of (1) acidic tripolyphosphates containing at most three alkali metal cations per molecule selected from the group consisting of Na and K and (2) trimetaphosphates containing from 1 to 3 alkali metal cations selected from the group consisting of Na and K; the ratio of K:Na in the slurry being from about 1:3 to about 1:7 and the ratio of the free water to the combined weights of said strong base and said triphosphate in said slurry being at most about 0.65:1.

---

The present invention relates to "mixed" alkali metal tripolyphosphates. More specifically, the present invention relates to certain sodium and potassium mixed tripolyphosphates, and to novel processes for their manufacture.

It is a major object of the present invention to provide novel crystalline "mixed cation" sodium and potassium tripolyphosphate materials.

It is another major object of the present invention to provide novel processes for the manufacture of these "mixed cation" sodium and potassium tripolyphosphate materials.

These objects, as well as others which will become apparent from the following discussion and claims, are attained by reacting together in a very concentrated aqueous slurry an appropriate strong sodium or potassium cation-containing base with either a linear (chain) acidic tripolyphosphate containing at most about 3 alkali metal cations per tripolyphosphate molecule or a (cyclic) trimetaphosphate containing from 1 to 3 sodium or potassium cations. Illustrative of the many specific ways in which the desired crystalline trisodium dipotassium tripolyphosphate compounds of the present invention can be obtained are the reactions of the following equations.

(1) $Na_5H_2P_3O_{10} + 2K^+ + 2OH^- \rightarrow Na_3K_2P_3O_{10} + 2H_2O$ (2) $Na_3P_3O_9 + 2K^+ + H_2O + 2OH^- \rightarrow Na_3K_2P_3O_{10} + 2H_2O$ (3) $Na_2HP_3O_9 + 2K^+ + Na^+ 3OH^- + H_2O \rightarrow Na_3K_2P_3O_{10} + 3H_2O$ (4) $NaH_2P_3O_9 + 2K^+ + 2Na^+ + 4OH^- + H_2O \rightarrow Na_3K_2P_3O_{10} + 4H_2O$ (5) $K_2H_3P_3O_{10} + 3Na^+ + 3OH^- \rightarrow Na_3K_2P_3O_{10} + 3H_2O$ (6) $K_3P_3O_9 + 3Na^+ + 2OH^- + H_2O \rightarrow Na_3K_2P_3O_{10} + K^+ + 2H_2O$ (7) $K_2HP_3O_9 + 3Na^+ + 3OH^- + H_2O \rightarrow Na_3K_2P_3O_{10} + 3H_2O$ (8) $KH_2P_3O_9 + 3Na^+ + K^+ + 4OH^- + H_2O \rightarrow Na_3K_2P_3O_{10} + 4H_2O$ Apparently, in accordance with the processes of the present invention, when any acidic sodium or potassium tripolyphosphate is brought into contact (in a very concentrated aqueous slurry system) with a sodium or a potassium (cation)-bearing strong base, with the result that the resulting mixture contains both sodium and potassium cations, the most stable tripolyphosphate structures in the systems are the trisodium dipotassium tripolyphosphate compositions of the present invention. One essential feature of the processes of the present invention, whereby the trisodium dipotassium tripolyphosphate materials of the present invention can be manufactured, is apparently the fact that these processes must be conducted in very concentrated aqueous systems (i.e., where the polyphosphate reactants and products are present largely in the undissolved state), for example, in aqueous slurries where the weight ratio of free water to the total combined weight of the particular strong base (or bases) and the trimeric phosphate reactants in the slurry is at most about 0.65:1, and is preferably between about 0.5:1 and about 0.2:1. One reason for the necessity of carrying out these processes in very concentrated systems is believed to be in order to prevent redissolution of a significant proportion of the novel $Na_3K_2P_3O_{10}$ product and any subsequent equilibration of the solution, resulting in reprecipitation of triphosphate materials in the less desirable $Na_5P_3O_{10}$ form. While materials other than reactants for the manufacture of the novel mixed alkali metal tripolyphosphate salts of the present invention can also be present in the concentrated aqueous slurries in substantial amounts, it is generally preferred that such reactants represent at least about 80 weight percent of the non-aqueous portion of the concentrated aqueous slurry composition at the outset of any of the individual preferred processes of this invention. When the desired reactants (i.e., base plus acidic linear triphosphate and/or cyclic triphosphate) are essentially the only non-aqueous materials present in the concentrated aqueous slurry, it is preferred that the processes of the present invention be conducted in slurries containing at most about 40 weight percent (and still further preferred, between about 15 and about 35 weight percent) of water.

The trisodium dipotassium tripolyphosphate compounds of the present invention can apparently exist in more than one crystalline form. X-ray diffraction patterns have been obtained, for example, for both an anhydrous form and for a hydrated form. The anhydrous form can be manufactured in the processes of the present invention when the aqueous slurry in which the basic reaction of strong potassium and/or sodium cation-containing base with trimeric phosphate is conducted in extremely concentrated (very high "solids") aqueous systems; that is, in aqueous slurries wherein the weight ratio of free water to the combined weight of base plus triphosphate reactants is at most about 0.3:1. The hydrated crystalline trisodium dipotassium tripolyphosphate of the present invention (which from chemical analysis appears to be the dihydrate) apparently results when the reaction of strong potassium and/or sodium-containing base with trimeric phosphate, as described above, is conducted in slightly more dilute systems than those in which the anhydrous trisodium tripotassium tripolyphosphate materials are manufactured. For example, it has been found that the hydrated trisodium dipotassium tripolyphosphate materials of the present invention can be manufactured in aqueous slurries wherein the ratio of free water to combined base plus trimeric phosphate is between about 0.6:1 and about 0.26:1, and preferably between 0.5:1 and about 0.28:1.

In Table I, below, the approximate relative intensities of the various X-ray diffraction "peaks" for the novel trisodium dipotassium tripolyphosphate materials of the present invention are given: (obtained with reference to $2\theta$ values for copper $K\alpha_1$ radiation)

TABLE I.—X-RAY DIFFRACTION PATTERNS FOR $Na_3K_2P_3O_{10}$

| Anhydrous Salt | | Hydrate | |
|---|---|---|---|
| d | Relative Intensity | d | Relative Intensity |
| 9.40 | 20 | 5.01 | 30 |
| 4.91 | 50 | 4.82 | 50 |
| 4.79 | 45 | 4.39 | 15 |
| 4.67 | 40 | 3.42 | 10 |
| 4.55 | 20 | 3.15 | 80 |
| 4.44 | 10 | 3.02 | 10 |
| 4.25 | 20 | 2.90 | 80 |
| 3.28 | 10 | 2.86 | 100 |
| 3.10 | 70 | 2.67 | 70 |
| 3.04 | 30 | 2.51 | 10 |
| 2.88 | 15 | 2.45 | 10 |
| 2.83 | 100 | 2.38 | 10 |
| 2.76 | 15 | 2.32 | 30 |
| 2.55 | 15 | | |
| 2.50 | 30 | | |
| 2.38 | 25 | | |
| 2.31 | 10 | | |
| 2.27 | 10 | | |

The anhydrous salt of the present invention can be converted to the hydrated salt by exposing the anhydrous salt to steam at about 100° C. for several minutes. The hydrated salt can be converted to the anhydrous salt by drying the hydrated salt at about 250° C. for several hours.

The "strong" sodium cation-containing bases and "strong" potassium cation-containing bases that are useful in the processes of the present invention include all of those that can cause the formation of sufficient hydroxyl ions in the concentrated aqueous slurry to react with the trimeric phosphate reactant, according to the overall reaction described above. For purposes of the present invention, useful "strong" bases are those that yield a solution pH measured at 25° C. of at least 10 when they are dissolved at the 1 weight percent level in distilled water. Thus, the term "strong sodium and potassium cation-bearing (or -containing) bases" encompasses, for example, such strongly basic compounds as sodium and potassium carbonate, trisodium and tripotassium orthophosphate, mixed tri-sodium and -potassium orthophosphates, sodium oxide, potassium oxide, sodium hydroxide, potassium hydroxide, sodium peroxide, potassium peroxide, sodium and potassium silicates (having $SiO_2/M_2O$ ratios lower than 2, wherein M is either Na, K or a mixture thereof), and the like. Note that some of these compounds do not actually contain hydroxyl ions, but cause the formation of hydroxyl ions [high pH] when they are dissolved in water. Economic considerations generally dictate that the strong base be inorganic in nature, and that the hydroxides, carbonates and silicates take preference. Of these, the hydroxides are particularly preferred.

Although for optimum results in the practice of the processes of this invention the ratio of Na to K of the reactants (polymeric triphosphate plus base) should be approximately 3 to 2, the desired crystalline trisodium dipotassium tripolyphosphate materials can be precipitated from the concentrated (slurry) reaction medium whenever the ionic ratio of K to Na therein exceeds about 1 to 3. At the other extreme, a significant amount of the desired $Na_3K_2P_3O_{10}$ product can be manufactured whenever this ionic ratio of K to Na in the concentrated reaction medium is as high as about 7 to 1 or even higher. When $Na_3H_2P_3O_{10}$ is the polymeric triphosphate reactant, generally at least two equivalents of one or more of the "strong" bases (preferably potassium-containing bases in this instance) should be present in the concentrated reaction medium per mole of $Na_3H_2P_3O_{10}$ that is to be converted to one of the $Na_3K_2P_3O_{10}$ salts of the present invention. When a sodium or potassium trimetaphosphate is the "polymeric triphosphate reactant," two additional equivalents of "strong" base per mole of trimetaphosphate must be used (over and above the number of hydrogens that may also be present on the trimetaphosphate "ring") in order to manufacture the desired trisodium dipotassium tripolyphosphate product in approximately theoretical amounts. For example, in the reaction of disodium trimetaphosphate with a mixture of potassium and sodium hydroxide;

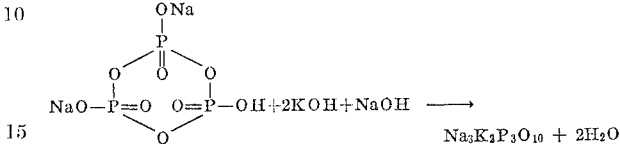

three equivalents of strong base are required; one to neutralize the hydrogen on the "ring," and two to complete the formation of desired "neutral" tripolyphosphate. Similarly monosodium dihydrogen trimetaphosphate requires four equivalents of "strong" base per mole of trimetaphosphate for the desired reaction to approach completion. Thus, whenever it is desired to manufacture either of the novel $Na_3K_2P_3O_{10}$ salts of the present invention in approximately theoretical amounts (starting with any of the aforesaid trimeric phosphate raw materials) generally at least about two equivalents of one (or a mixture) of the strong bases per mole of triphosphate raw material should be present in the concentrated aqueous slurry reaction mixture. "Excess" base (more than that amount theoretically required to manufacture the desired mixed cation tripolyphosphate product) apparently does not inhibit the desired reaction, so that fairly large amounts of base (i.e., up to as much as 6 equivalents of base per mole of triphosphate, or even more) can be present in these concentrated aqueous slurries. However, use of at most about 4 equivalents of "strong" base per mole of trimeric phosphate "raw" material is preferred. Of course, if less than theoretical conversion of the trimeric phosphate into the desired product is desired, significantly less than two equivalents of the "strong" base per mole of triphosphate can also be utilized in the successful practice of the processes of this invention. In the case of trisodium trimetaphosphate, the desired reaction (with a "strong" potassium-bearing base such as KOH) proceeds to the extent that "strong" base is available for reaction, whether or not at least stoichiometric (2 equivalents of base per mole of trimetaphosphate) amounts of these reactants are utilized.

In the following examples, which are illustrative of some of the preferred embodiments of the present invention, all parts are by weight unless otherwise specified.

*Example 1*

Into a conventional stainless steel reactor fitted with a conventional turbine-type mixer at room temperature are placed 2600 parts of water and 30,600 parts of trisodium trimetaphosphate. After the resulting mixture has been stirred for about 15 minutes, 22,400 parts of a 50 weight percent aqueous solution of potassium hydroxide are added to the mixture over the next 5 minutes. The temperature of the resulting very concentrated slurry (about 72 weight percent "solids"— non-volatile at about 105° C.) is allowed to climb to about 103° C., at which point steam is observed bubbling out of the reaction mixture or medium. During the ten minutes immediately succeeding the addition of the KOH into the slurry the reaction mixture solidifies. Then it is removed from the mixer and allowed to cool to room temperature. It contains only about 15 weight percent of free water (which can be removed by conventionally drying the product if desired, about 80 weight percent of crystalline hydrated $Na_3K_2P_3O_{10}$, and practically no unreacted trimetaphosphate, or orthophosphate and pyrophosphate degradation products. The hydrated salt contains 9 weight percent of water which can be removed by drying the salt for 3 hours at about 200° C.

After removal of the free water, this product is found to be soluble in distilled water at room temperature to the extent of about 30 weight percent. This is a significantly greater solubility in water than, for example, sodium tripolyphosphate hexahydrate, which is soluble in distilled water only to the extent of about 14 weight percent. This greater solubility of the products of the present invention in water (over that of sodium tripolyphosphate), coupled with their excellent hardness ion complexing ability, illustrates one of the valuable advantages of the products of the invention: They can be used advantageously as builders in "built" heavy duty liquid detergent compositions, wherein the high water solubility of the $Na_3K_2P_3O_{10}$ materials of this invention makes these materials particularly desirable for use as builders in tripolyphosphate "built" liquid detergent compositions.

*Example II*

Example I is repeated, except that no water is initially intermixed with the trisodium trimetaphosphate, and 21,300 parts of a 52.5 weight percent solution (aqueous) of KOH is utilized in this instance, rather than the 50% solution used in Example I. Practically complete conversion of the trimetaphosphate to anhydrous $Na_3K_2P_3O_{10}$ is thus obtained.

*Example III*

Three hundred parts of disodium monohydrogen trimetaphosphate and 40 parts of water are blended together for 10 minutes, during which time the temperature of the mixture is raised to about 60° C. Then, over the next minute, 170 parts of a 50 weight percent aqueous solution of potassium hydroxide are mixed into the blend. The resulting air-dried, solidified product is found (by X-ray diffraction techniques) to contain hydrated $Na_3K_2P_3O_{10}$ and some unreacted materials.

*Example IV*

Three hundred parts of trisodium trimetaphosphate and 230 parts of water are blended together for 10 minutes. Into the resulting mixture are then added, over the next 5 minutes, 135 parts of powdered potassium carbonate. Since, apparently, only half of the potassium carbonate is strong enough to react with the trimetaphosphate, very little $CO_2$ is evolved during the subsequent reaction. After about 40 minutes (after the last of the $K_2CO_3$ has been added into the reaction mixture) of continuous agitation, and subsequent cooling of the reaction mixture to about 35° C., crystalline hydrated $Na_3K_2P_3O_{10}$ is found to be the only crystalline phosphate material in the solidified product.

*Example V*

Into a reaction vessel containing 524 parts of monosodium dihydrogen trimetaphosphate are slowly stirred (over a 20 minute period of time) 772 parts of a 50 weight percent aqueous solution of an equimolar mixture of sodium hydroxide and potassium hydroxide. During the addition of the sodium and potassium hydroxide, the temperature of the reaction mixture is maintained between about 50° C. and about 60° C. by externally cooling the mixture with cold water. The resulting product consists largely of hydrated crystalline $Na_3K_2P_3O_{10}$.

*Example VI*

Into 32,400 parts of trisodium dihydrogen tripolyphosphate in a conventional stainless steel reactor are stirred (over a 10 minute period of time) 23,400 parts of a 48 weight percent aqueous solution of potassium hydroxide. The temperature of the resulting reaction mixture is allowed to rise to about 65° C. After about 10 minutes subsequent to the addition of the last of the potassium hydroxide, the resulting product is removed from the reactor and placed in a forced-draft oven maintained at about 105° C. for 75 minutes in order to remove the free water from the product. After it is dried, the product is found to be practically pure anhydrous $Na_3K_2P_3O_{10}$.

*Example VII*

Example VI is repeated, except that 30,000 parts of a 37.5 weight percent aqueous solution of KOH are utilized in the reactor. Practically pure hydrated $Na_3K_2P_3O_{10}$ results.

*Example VIII*

Example VII, above, is repeated, except that 33,400 parts of dipotassium trihydrogen tripolyphosphate are utilized in place of the trisodium dihydrogen tripolyphosphate and 31,400 parts of a 38.2 weight percent aqueous solution of sodium hydroxide are used in place of the potassium hydroxide solution. The products from Examples VII and VIII are practically identical.

*Example IX*

Example I, above, is repeated, except that 35,400 parts of tripotassium trimetaphosphate are used in place of the trisodium trimetaphosphate and 29,600 parts of a 40 weight percent aqueous solution of sodium hydroxide are used in place of the potassium hydroxide solution of Example I. The resulting concentrated slurry contains 73 weight percent of non-volatile "solids." After the "strong" base has reacted with the trimetaphosphate, the resulting reaction mixture is removed from the reactor and permitted to cool to room temperature. It contains a large amount of hydrated $Na_3K_2P_3O_{10}$, according to X-ray diffraction analysis.

*Example X*

Example III, above, is repeated, except that 15,800 parts of dipotassium monohydrogen trimetaphosphate are utilized in place of the disodium monohydrogen trimetaphosphate, 9350 parts of water, and 6000 parts of powdered sodium hydroxide are used in place of the potassium hydroxide solution. The only crystalline material on the filter after the filtration step is found to be hydrated $Na_3K_2P_3O_{10}$.

*Example XI*

Into a stainless steel reactor are blended 1272 parts of "mixed metaphosphate": $3[(NaPO_3)_3 \cdot KPO_3]$ and 353 parts of water. Over a period of about 5 minutes, 672 parts of a 50 weight percent aqueous solution of a mixture of NaOH and KOH in a molar ratio, respectively, of 7:1 are mixed into the resulting blend. Although the ratio of reactants theoretically should yield $Na_4KP_3O_{10}$, the only crystalline tripolyphosphates found in the resulting product are hydrated $Na_3K_2P_3O_{10}$ and a trace of hydrated $Na_5P_3O_{10}$.

*Example XII*

Into a stainless steel reactor are poured 2840 parts of disodium monohydrogen trimetaphosphate. Over a period of 10 minutes, 3180 parts of a 53 weight percent aqueous solution of potassium hydroxide are then intermixed therewith. Although, theoretically, the product should be $Na_2K_3P_3O_{10}$, the only crystalline tripolyphosphate found in the resulting product is hydrated $Na_3K_2P_3O_{10}$.

*Example XIII*

In a series of reactions, trisodium trimetaphosphate is reacted with mixtures of NaOH and KOH in various molar ratios, in a study of the types of tripolyphosphate products that can result from such treatment. In each instance "total solids" (trimetaphosphate plus base) of the slurry is 79 weight percent.

| Run | Ratio [1] | Product [2] |
|---|---|---|
| (a) | 1:7 | 95% anhydrous Na₃K₂P₃O₁₀+5% sodium tripolyphosphate hexahydrate. |
| (b) | 3:7 | 90% anhydrous Na₃K₂P₃O₁₀+10% sodium tripolyphosphate hexahydrate. |
| (c) | 7:9 | Do. |
| (d) | 1:1 | 50% anhydrous Na₃K₂P₃O₁₀+50% sodium tripolyphosphate hexahydrate. |
| (e) | 9:7 | 40% anhydrous Na₃K₂P₃O₁₀+60% sodium tripolyphosphate hexahydrate. |

[1] Mol ratio of NaOH to KOH.   [2] Identified by X-ray.

What is claimed is:

1. A process for manufacturing trisodium dipotassium tripolyphosphate, which process comprises reacting together in a concentrated aqueous slurry a strong base selected from the group consisting of strong sodium cation-bearing bases and strong potassium cation-bearing bases and a triphosphate selected from the group consisting of (a) linear acidic tripolyphosphates containing at most 3 alkali metal cations per molecule selected from the group consisting of Na and K, and (b) trimetaphosphates containing from one to three alkali metal cations selected from the group consisting of Na and K to thereby form a reaction product containing said trisodium dipotassium tripolyphosphate; the ratio of K to Na in said slurry being from about 1:3 to about 7:1 and the ratio of the weight of free water to the total combined weights of said strong base and said triphosphate in said slurry being at most about 0.65:1.

2. A process as in claim 1, wherein the ratio of moles of said triphosphate to equivalents of said strong base in said slurry is within the range of from about 1:2 to about 1:4, and the ratio of the weight of the free water to the total combined weights of said strong base and said triphosphate in said slurry is at most about 0.65:1.

3. A process as in claim 2, wherein said triphosphate has the structure

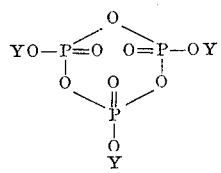

wherein Y is selected from the group consisting of Na, K and H, at least one Y is an alkali metal cation selected from the group consisting of Na and K, and the amount of said strong base in said concentrated aqueous slurry is between about 2 and about 4 equivalents per mole of said trimeric phosphate.

4. A process as in claim 2, wherein said triphosphate is sodium trimetaphosphate and said strong base is a strong potassium-bearing base.

5. A process as in claim 2, wherein said triphosphate is a linear acidic sodium tripolyphosphate containing at most 3 sodium cations per molecule, said strong base is a strong potassium cation-bearing base, and the amount of said base in said concentrated aqueous slurry is between about 2 and about 4 equivalents per mole of said acidic sodium tripolyphosphate.

6. A process as in claim 2, wherein said triphosphate is a linear acidic potassium tripolyphosphate containing at most 3 potassium cations per molecule, said strong base is a strong sodium cation-bearing base, and the amount of said base in said concentrated aqueous slurry is between about 2 and about 4 equivalents per mole of said acidic potassium tripolyphosphate.

7. A process as in claim 4, wherein said strong potassium-bearing base is potassium hydroxide.

8. A process as in claim 5, wherein said linear acidic sodium tripolyphosphate is trisodium dihydrogen tripolyphosphate and said strong base is potassium hydroxide.

9. A process as in claim 6, wherein said linear acidic potassium tripolyphosphate is dipotassium trihydrogen tripolyphosphate and said strong base is sodium hydroxide.

10. A process as in claim 6, wherein said linear acidic potassium tripolyphosphate is dipotassium trihydrogen tripolyphosphate, said strong base is sodium carbonate, and the amount of said sodium carbonate in said concentrated aqueous slurry is between about 2 and about 10 equivalents per mole of said dipotassium trihydrogen tripolyphosphate.

11. A process as in claim 7, wherein said weight ratio is between about 0.28:1 and about 0.20:1.

12. A process which comprises reacting together potassium hydroxide and trisodium trimetaphosphate in a concentrated aqueous slurry containing between about 15 and about 35 weight percent of free water, based on the combined weights of said free water, said potassium hydroxide, and said trisodium trimetaphosphate to thereby produce a crystalline trisodium dipotassium tripolyphosphate.

13. A process as in claim 12, wherein the weight ratio of said free water to the combined weights of said potassium hydroxide plus said trisodium trimetaphosphate is between about 0.5:1 and about 0.28:1, respectively; whereby a hydrated crystalline trisodium dipotassium tripolyphosphate is produced.

14. A process as in claim 12, wherein the amount of said potassium hydroxide in said concentrated aqueous slurry is about 2 moles per mole of said trisodium trimetaphosphate.

15. A process as in claim 13, wherein the amount of said potassium hydroxide in said concentrated aqueous slurry is about 2 moles per mole of said trisodium trimetaphosphate.

16. A new crystalline compound selected from the group consisting of hydrated and anhydrous trisodium dipotassium tripolyphosphates.

17. Crystalline Na₃K₂P₃O₁₀·2H₂O.

18. Crystalline anhydrous Na₃K₂P₃O₁₀.

References Cited

UNITED STATES PATENTS 2,948,588   1/1960   Baumann _____ 23—106

OTHER REFERENCES

Van Wazer: "Phosphorus and Its Compounds," vol. 1, pp. 656, 657, 658 and 659, Interscience, New York, 1958.

OSCAR R. VERTIZ, *Primary Examiner.*

L. A. MARSH, *Assistant Examiner.*